(12) United States Patent
Sato

(10) Patent No.: US 9,496,603 B2
(45) Date of Patent: Nov. 15, 2016

(54) ELECTRONIC APPARATUS

(71) Applicant: Kabushiki Kaisha Toshiba, Minato-ku, Tokyo (JP)

(72) Inventor: Koichi Sato, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/834,234

(22) Filed: Aug. 24, 2015

(65) Prior Publication Data
US 2016/0154438 A1 Jun. 2, 2016

Related U.S. Application Data

(60) Provisional application No. 62/086,067, filed on Dec. 1, 2014.

(51) Int. Cl.
*G06F 1/16* (2006.01)
*H01Q 1/24* (2006.01)
*H01Q 1/22* (2006.01)

(52) U.S. Cl.
CPC ............ *H01Q 1/243* (2013.01); *G06F 1/1601* (2013.01); *G06F 1/162* (2013.01); *G06F 1/1605* (2013.01); *G06F 1/1607* (2013.01); *G06F 1/169* (2013.01); *G06F 1/1654* (2013.01); *G06F 1/1664* (2013.01); *G06F 1/1698* (2013.01); *H01Q 1/2266* (2013.01); *H01Q 1/2291* (2013.01); *H01Q 1/241* (2013.01); *H01Q 1/242* (2013.01)

(58) Field of Classification Search
CPC .................... H01Q 1/241; H01Q 1/242; H01Q 1/243; H01Q 1/244; H01Q 1/245; H01Q 1/2266; H01Q 1/2291; G06F 1/1607; G06F 1/1601; G06F 1/1603; G06F 1/1605
USPC .................. 361/679.21–679.3, 679.01–679.2, 361/679.55–679.59; 343/702
See application file for complete search history.

(56) References Cited

U.S. PATENT DOCUMENTS

| | | | | |
|---|---|---|---|---|
| 6,642,892 B2 * | 11/2003 | Masaki | ............... | H01Q 1/2266 343/700 MS |
| 6,853,336 B2 * | 2/2005 | Asano | ...................... | H01Q 1/22 343/702 |
| 7,043,209 B2 * | 5/2006 | Hirota | ................... | G06F 1/1616 343/725 |
| 7,167,726 B2 * | 1/2007 | Ghosh | ................... | G06F 1/1616 342/162 |
| 7,522,109 B2 * | 4/2009 | Shimasaki | ............ | G06F 1/1616 343/700 MS |
| 8,310,825 B2 * | 11/2012 | Schlesener | ............ | G06F 1/1616 343/702 |

(Continued)

FOREIGN PATENT DOCUMENTS

| | | |
|---|---|---|
| JP | 2009-231952 | 10/2009 |
| JP | 2013-247613 | 12/2013 |
| JP | 2014-115989 | 6/2014 |

*Primary Examiner* — Nidhi Thaker
(74) *Attorney, Agent, or Firm* — Knobbe, Martens, Olson & Bear LLP

(57) ABSTRACT

An electronic apparatus in one embodiment is brought to a tablet state, in which a first housing having antennas and a display unit is placed over a second housing having an electrically conductive member and allows input from the display unit. In the tablet state, a part of one of the antennas is over the electrically conductive member.

10 Claims, 6 Drawing Sheets

(56) References Cited

U.S. PATENT DOCUMENTS

| | | | |
|---|---|---|---|
| 8,441,783 B2* | 5/2013 | Tanaka | G06F 1/1616 |
| | | | 16/250 |
| 9,107,301 B2* | 8/2015 | Pan | H05K 5/0226 |
| 2002/0024469 A1* | 2/2002 | Masaki | G06F 1/1616 |
| | | | 343/702 |
| 2009/0239488 A1* | 9/2009 | Gushiken | H01Q 1/2266 |
| | | | 455/132 |
| 2011/0075356 A1* | 3/2011 | Tanaka | G06F 1/1616 |
| | | | 361/679.55 |
| 2011/0115735 A1* | 5/2011 | Lev | G06F 1/1616 |
| | | | 345/173 |
| 2012/0162040 A1* | 6/2012 | Taura | G06F 1/1698 |
| | | | 343/770 |
| 2014/0118198 A1* | 5/2014 | Kawashimo | H01Q 1/42 |
| | | | 343/702 |
| 2014/0159970 A1 | 6/2014 | Yeh et al. | |
| 2015/0380804 A1* | 12/2015 | Lim | G06F 1/162 |
| | | | 343/702 |

* cited by examiner

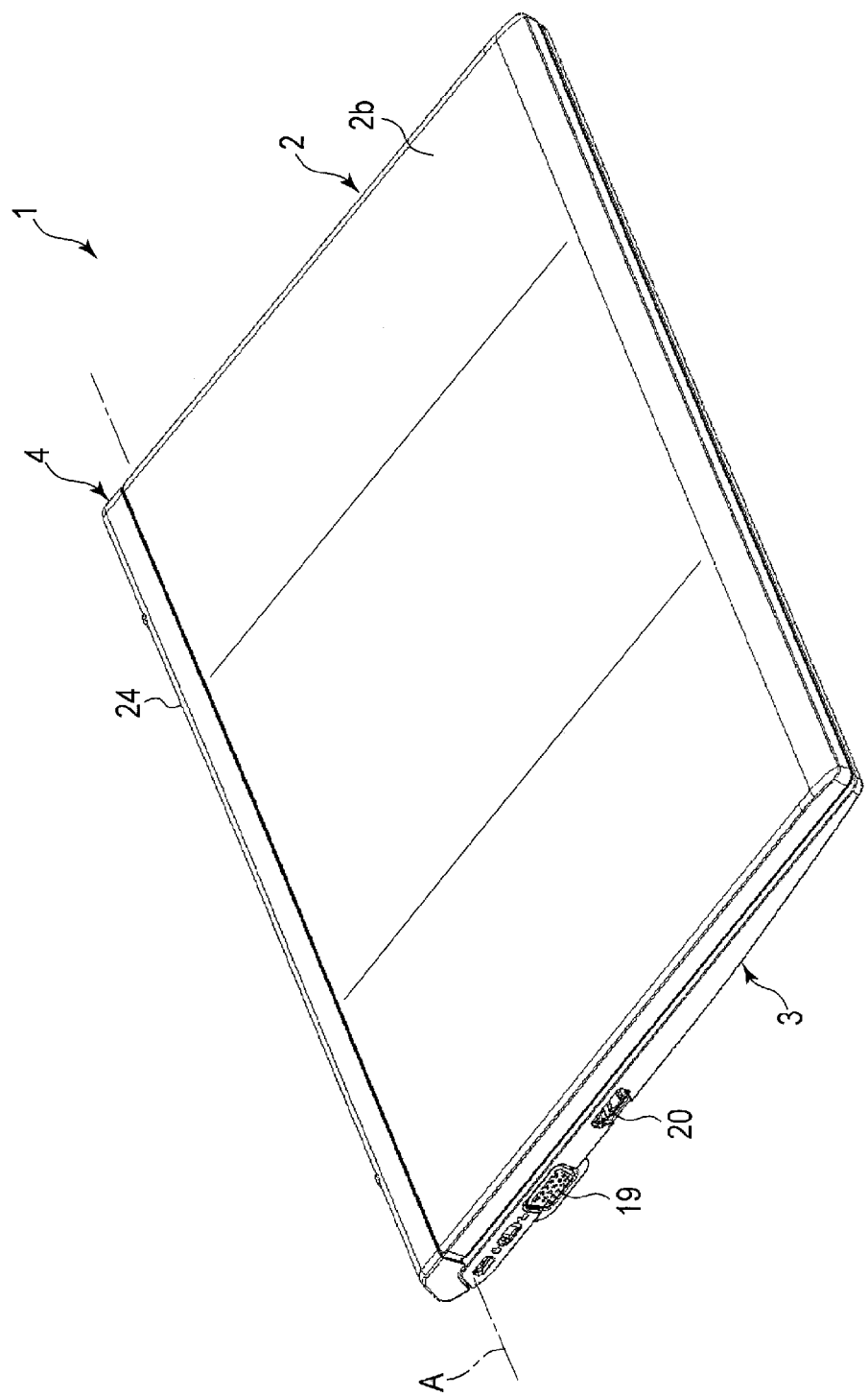
F I G. 2

ELECTRONIC APPARATUS

CROSS-REFERENCE TO RELATED APPLICATIONS

This application claims the benefit of U.S. Provisional Application No. 62/086,067, filed Dec. 1, 2014, the entire contents of which are incorporated herein by reference.

FIELD

Embodiments described herein relate generally to an electronic apparatus.

BACKGROUND

There are known convertible computers (two-in-one devices) which function as both notebook (clamshell) computers and tablet computers. In a certain convertible computer, a keyboard dock is connected to the back of a tablet, and the tablet receives input operation or executes communication in such a configuration. In order to maintain the antenna performance constant, the antenna embedded in the tablet must be kept distant from a touch operation unit provided at the keyboard dock. The touch operation unit is an electrically conductive member having a touchpad, a left button, and a right button.

When keeping the antenna distant from the touch operation unit, a tablet may become bigger depending on how far in which direction the antenna is kept away from the touch operation unit. Therefore, it is undeniable that a two-in-one device having such a tablet will be prevented from becoming small and thin.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary perspective view illustrating a closed state of the electronic apparatus of FIG. 1;

DETAILED DESCRIPTION

Figure 1:
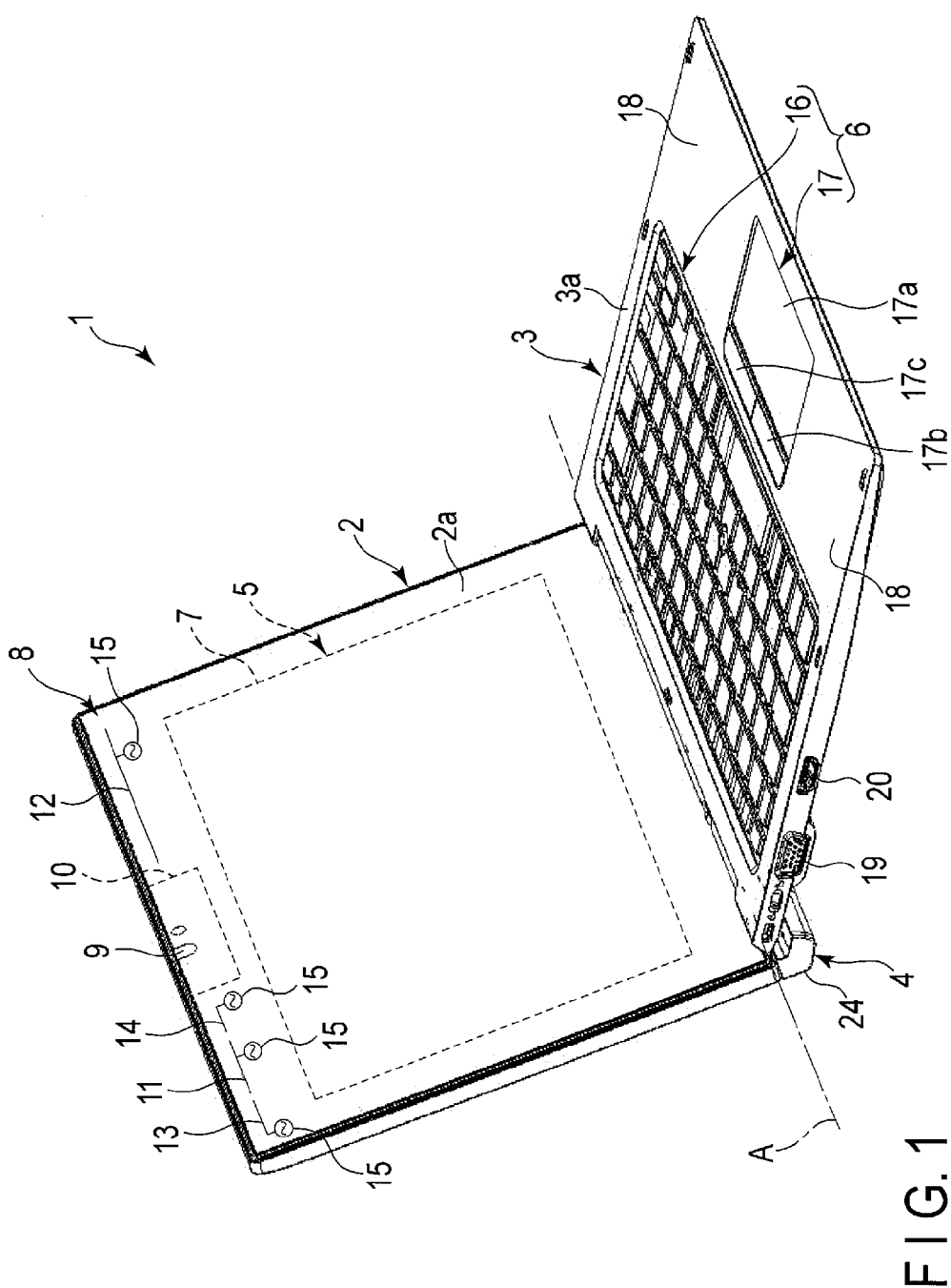
FIG. 1 is an exemplary perspective view illustrating an open state of an electronic apparatus in one embodiment.

Various embodiments will be described hereinafter with reference to the accompanying drawings. In general, according to one embodiment, an electronic apparatus is brought to a tablet state, in which a first housing having antennas and a display unit is placed over a second housing having an electrically conductive member and allows input from the display unit. In the tablet state, a part of one of the antennas is over the electrically conductive member.

Now, an electronic apparatus in one embodiment will be explained below with reference to the drawings.

FIG. 1-FIG. 5 illustrate a wireless communication device 1 as an example of an electronic apparatus. The wireless communication device 1 is a convertible computer (a two-in-one device) which functions as both a notebook (clamshell) computer and a tablet computer.

[Gist of Wireless Communication Device 1]

The wireless communication device 1 has a first housing 2, a second housing 3, and a connecting mechanism 4 detachably connecting the first housing 2 and the second housing 3. The first housing 2 accommodates a display unit 5 having an input function. The first housing 2 has a display surface 2a of the display unit 5 and a back surface 2b opposite to the display surface 2a (FIG. 2). The second housing 3 accommodates an operation unit 6. The second housing 3 has the operation surface 3a of the operation unit 6. The connecting mechanism 4 detachably connects the first housing 2 and the second housing 3. The connecting mechanism 4 allows the two housings 2 and 3 to rotate relative to each other under the state of detachably connecting the first housing 2 and the second housing 3.

Figure 4:
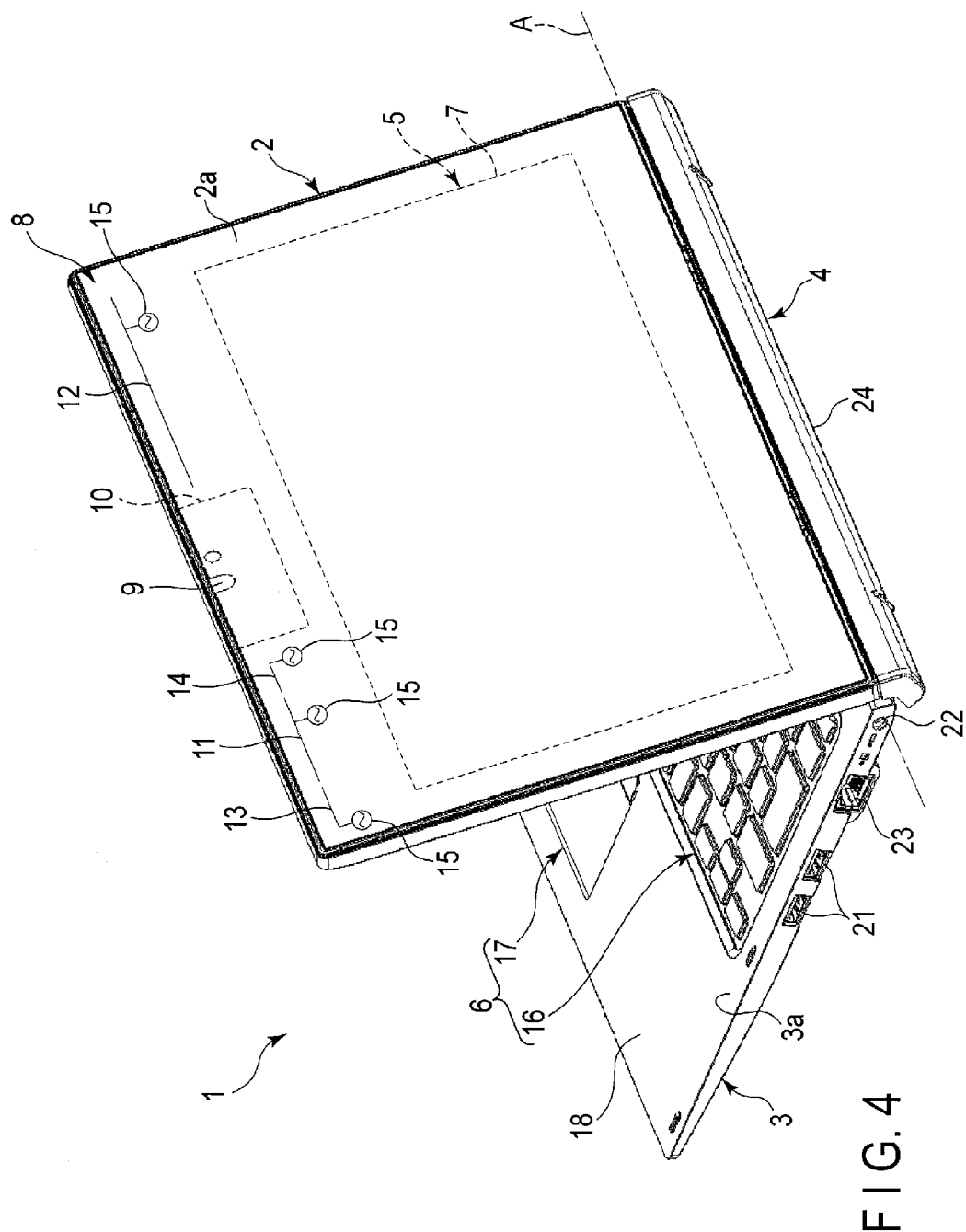
FIG. 4 is an exemplary perspective view illustrating a standing state of the electronic apparatus of FIG. 1.
Figure 5:
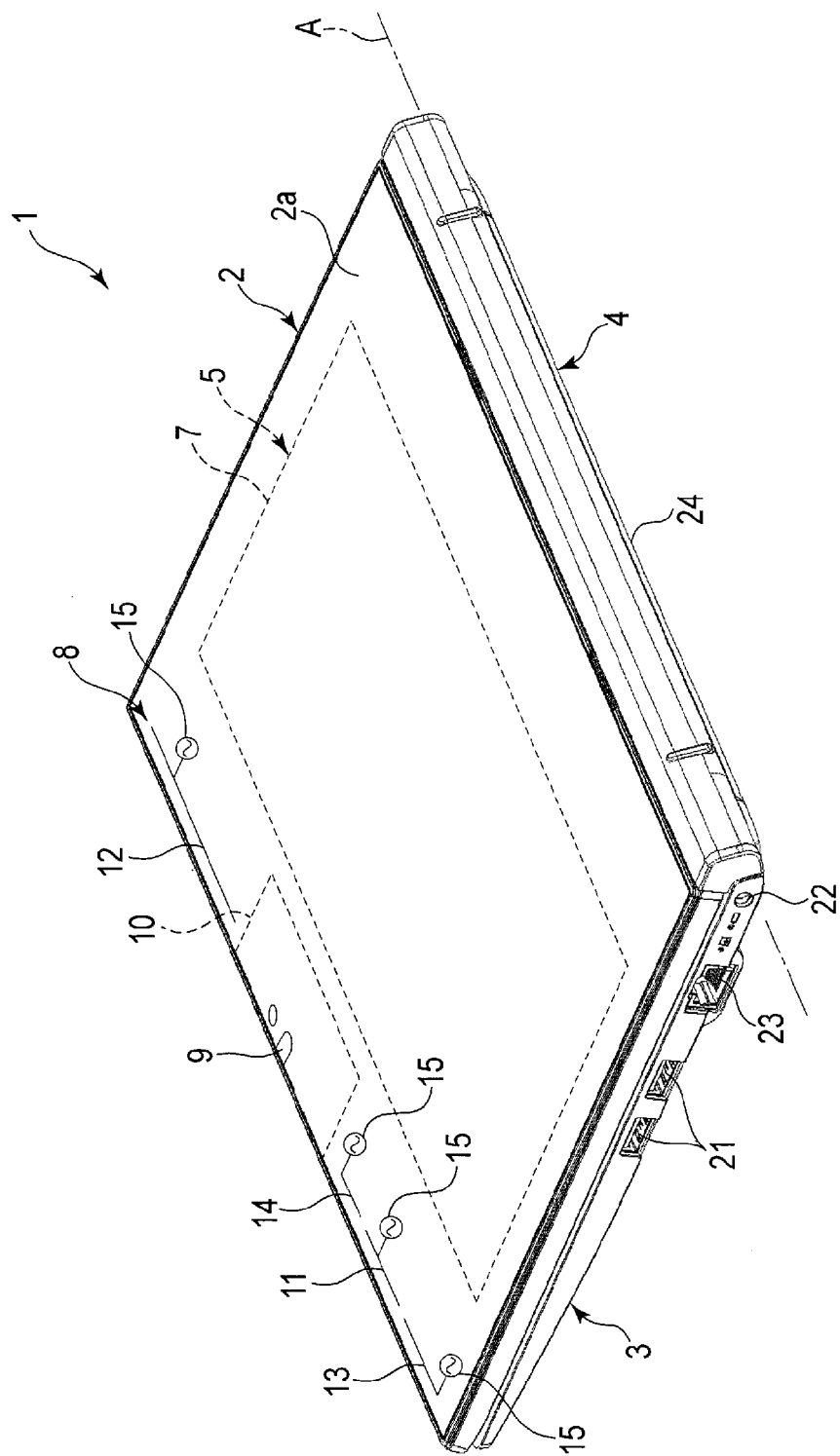
FIG. 5 is an exemplary perspective view illustrating a tablet state of the electronic apparatus of FIG. 1.

The above structure makes it possible to change the wireless communication device 1 into an open state (FIG. 1), a closed state (FIG. 2), an upright state (FIG. 4), or a tablet state (FIG. 5).

In the open state, the first housing 2 and the second housing 3 are connected with each other in such a manner that the display surface 2a can come closer to the operation surface 3a. In other words, the first housing 2 and the second housing 3 are connected with each other in such a manner that a user can simultaneously see both the display surface 2a and the operation surface 3a. The user can operate the operation unit 6 while confirming what is displayed on the display surface 2a.

In the closed state, the connection between the first housing 2 and the second housing 3 allows the display surface 2a to face the operation surface 3a. In other words, the first housing 2 and the second housing 3 are connected with each other in such a manner that a user can see neither the display surface 2a nor the operation surface 3a. In the closed state, the user cannot operate the wireless communication device 1 with the use of the operation unit 6, but the communication function of the wireless communication device 1 is still available. Therefore, a wireless communication is possible using a wireless system (an antenna), which will be explained later, so long as the user sets an operating system (OS) effective in communication even in the closed state.

In the standing state, the connection between the first housing 2 and the second housing 3 causes the display surface 2a to face toward a direction opposite to the direction toward which the operation surface 3a faces. In other words, the first housing 2 and the second housing 3 are connected with each other in such a manner that a user cannot see the display surface 2a so long as he or she sees the operation surface 3a. In the standing state, the user operates the operation unit 6 separately from confirmation of what is displayed on the display surface 2a.

In the tablet state, the display surface 2a is exposed but the operation surface 3a is invisible, because the first housing 2 is placed over the second housing 3 with the back surface 2b (FIG. 2) facing the operation surface 3a. In other words, the first housing 2 is connected to and placed over the second housing 3 in such a manner that the back surface 2b (FIG. 2) faces the operation surface 3a and thus the user cannot see the operation surface 3a but can see the display surface 2a. The wireless communication device 1 functions as a tablet device that allows not only input from the display unit 5 but also a wireless communication. The user touches the display surface 2a to operate the wireless communication device 1.

[First Housing 2]

As illustrated in FIG. 1 and FIG. 2, the first housing 2 can be separated from the second housing 3 (FIG. 3), and can function as a tablet device independently usable as a computer. The first housing 2 has inside of it the display unit 5, an input unit 7, a communication unit 8, a control circuit for controlling these units, a circuit board on which the control circuit is mounted, memory circuits (RAM, ROM), a battery, etc.

A liquid crystal display (LCD) or an organic EL display, for instance, may be used as the display unit 5. A touchpanel may be used as the input unit 7, for instance. A pressure-sensitive system, an electrostatic system, a digitizer system, or the like, for instance, may be used as the input system of the touchpanel.

Furthermore, it is possible to install in the first housing 2 a camera 9, a camera board 10, a speaker, a speaker board, a USB connector, a memory card slot, a headphone socket, an image output socket, a microphone, etc., for instance.

The communication unit 8 is constructed to have a plurality of antennas 11, 12, 13, and 14, each corresponding to any one of a plurality of wireless communication systems. Antennas 11, 12, 13, and 14 are arranged to evade any constituent elements, such as the display unit 5, the camera 9, the camera board 10, etc. In the attached drawings, antennas 11, 12, 13, and 14 are arranged to evade the display unit 5 and are separately located at both sides of the camera board 10.

Each of antennas 11, 12, 13, and 14 has two ends. Antennas 11, 12, 13, and 14 are connected with feedpoints 15 at their respective one ends, but are open at their respective other ends. Any one of the feedpoints 15 is a node between a feeder and a corresponding one of antennas 11, 12, 13, and 14. It transmits a high frequency signal from any one of transmitters to a corresponding one of antennas 11, 12, 13, and 14 or from one of antennas 11, 12, 13, and 14 to a corresponding one of receivers.

Antennas 11, 12, 13, and 14 are set to have their respective lengths (namely, their respective element lengths) for transmitting or receiving respective radio signals based on the frequencies used in the respective wireless systems (the respective antennas 11, 12, 13, and 14). The element length of each antenna is determined according to the wavelength of a radio signal which the antenna transmits or receives. For instance, the higher the frequency which an antenna uses will be, the shorter the element length of the antenna will be in the present embodiment. Conversely, the lower the frequency which an antenna uses will be, the longer the element length of the antenna will be.

The wireless systems (antennas 11, 12, 13, and 14) are required to manage various frequency bands besides the frequency band for telephone calls. Therefore, the first housing 2 has inside of it a plurality of wireless systems which uses different frequency bands. For instance, a first wireless system is a 3G/LTE mobile communication system, and a frequency band which the system uses may be either 700-900 MHz or 1.7-1.9 GHz. The second wireless system is a wireless communication system, and a frequency band which the system uses may be either 2.4 GHz or 1.95 GHz.

The first wireless system has the first antenna 11 and the second antenna 12. The second wireless system has the third antenna 13 and the fourth antenna 14. The third and the fourth antenna are set shorter in element length than the first and the second antenna. The fourth antenna is set shorter in element length than the third antenna.

[Second Housing 3]

As illustrated in FIG. 1 and FIG. 2, the second housing 3 functions as an extended unit of the first housing 2 (a keyboard dock) when it is connected to the first housing 2. As an example of the extended function, the second housing 3 accommodates the operation unit 6. The operation unit 6 has a keyboard 16 and an electrically conductive member.

The electrically conductive member is formed as a touch operation unit 17 which the user operationally touches by his or her finger in the open state (FIG. 1) or in the standing state (FIG. 4). The touch operation unit 17 has a touchpad 17a, a left button 17b, and a right button 17c.

A region where the touchpad 17a is formed is provided with electrodes to detect the touch operation executed by the user. The electrodes are spread over the entire surface of the touchpad 17a. Therefore, the touchpad 17a functions as a sheet conductive body to the aforementioned antennas.

A set of a conductive mechanism and a circuit for detecting whether or not the left button 17b is pressed is directly under the left button 17b. A set of a conductive mechanism and a circuit for detecting whether or not the right button 17c is pressed is directly under the right button 17c.

The keyboard 16 and the touch operation unit 17 are arranged on the operation surface 3a of the operation unit 6 provided on a palmrest 18. In one exemplary arrangement, the keyboard 16 on the operation surface 3a is located at an area near the end surface of the first housing 2. The palmrest 18 is constructed to extend widthwise and to span the touch operation unit 17. The keyboard 16 and the touch operation unit 17 are surrounded by the operation surface 3a including the palmrest 18, and are exposed to the outside.

It is possible for the second housing 3 to accommodate, for instance, image output sockets 19, 20 (FIG. 1-FIG. 3), a USB connector 21 (FIG. 4, FIG. 5), a power connector 22 (FIG. 4, FIG. 5), a LAN connector 23 (FIG. 4, FIG. 5), a control circuit, a circuit board on which the control circuit is mounted, memory circuits (RAM, ROM), a battery, etc.

[Connecting Mechanism 4]

Figure 3:
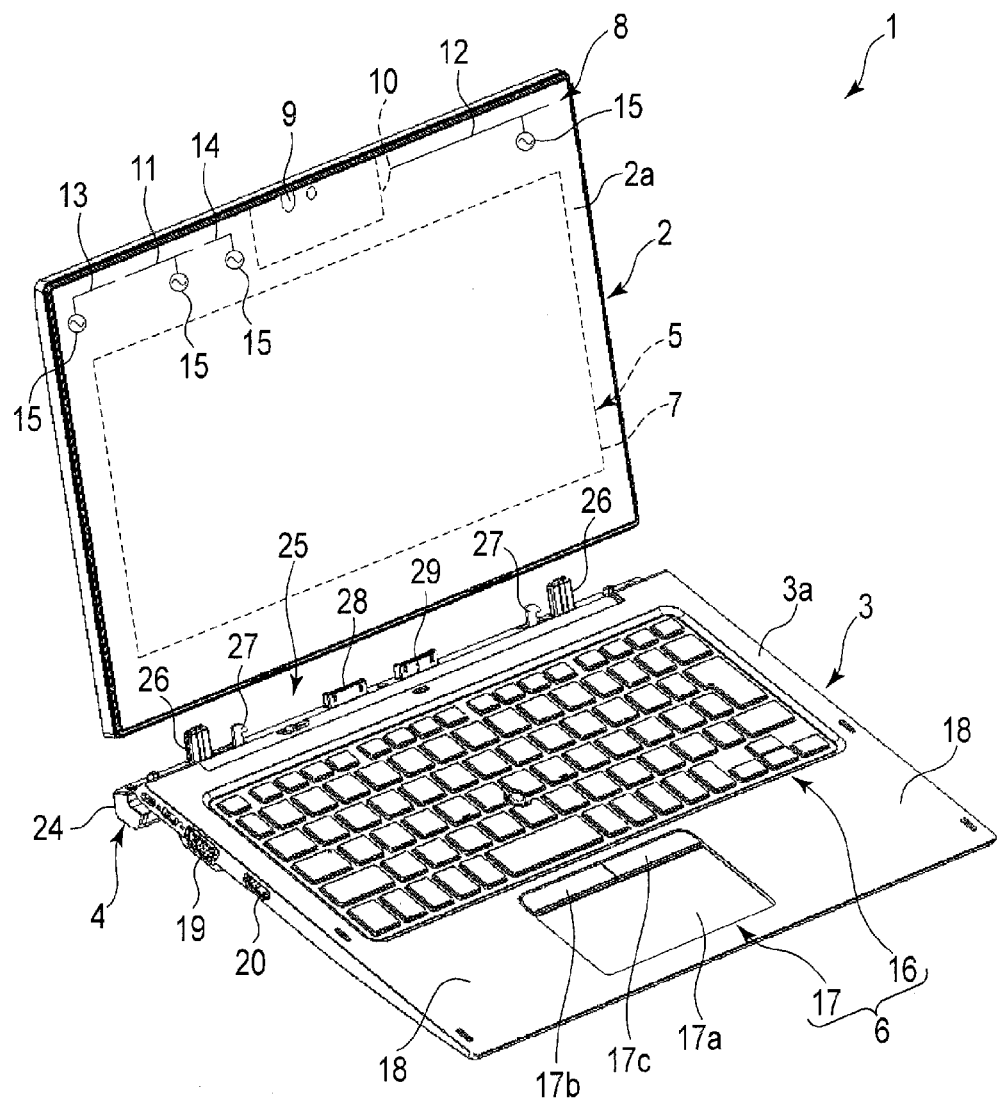
FIG. 3 is an exemplary perspective view illustrating a separate state of the electronic apparatus of FIG. 1, in which a first housing is separated from a second housing.

As illustrated in FIG. 3, the connecting mechanism 4 has a joint 24. The joint 24 is between the end surface of the first housing 2 and the end surface of the second housing 3. The joint 24 is attached to the end surface of the second housing 3 by means of hinges not illustrated in any of the drawings. The joint 24 is constructed to freely rotate about a single axis of rotation A (FIGS. 1, 2, 4, 6 and 7).

The joint 24 has an attachment portion 25. The attachment portion 25 has holders 26 and hooks 27. Therefore, the attachment portion 25 allows the first housing 2 to be detachably attached to the joint 24. When the first housing 2 is attached to the joint 24, the first housing 2 and the second housing 3 can be made relatively rotate with respect to each other.

When the first housing 2 and the second housing 3 are connected with each other in such a manner that the display surface 2a can come closer to the operation surface 3a on the condition that the first housing 2 is attached to the joint 24, it will be possible to bring the first housing 2 and the second housing 3 to the open state (FIG. 1) or to the closed state (FIG. 2).

Now, when the first housing 2 is detached from the joint 24 and reversely attached to the attachment portion 25, then the first housing 2 and the second housing 3 are connected with each other in such a manner that the display surface 2*a* does not face the operation surface 3*a* when closed. This makes it possible to bring the wireless communication device 1 to the standing state (FIG. 4), in which the first housing 2 is supported by the second housing 3, or to the tablet state (FIG. 5), in which the first housing 2 is placed over the second housing 3 with the display surface 2*a* being exposed but the operation surface 3*a* being concealed.

The connecting mechanism 4 has a connector unit which allows the second housing 3 to function as an extended unit of the first housing 2. The connector unit comprises two parts, one provided at the joint 24 and the other at the end surface of the first housing 2, for instance.

The one of the parts of the connector unit provided at the joint 24 has a first connector 28 and a second connector 29. The first connector 28 and the second connector 29 are electrically connected to the components (such as the operation unit 6, image output sockets 19, 20, etc.) accommodated by the second housing 3.

The wireless communication device 1 has a detection unit to determine how the first housing 2 is connected to the second housing 3. The detection unit determines whether the first housing 2 and the second housing 3 are connected with each other in such a manner that the display surface 2*a* faces the operation surface 3*a* when closed (FIG. 1 illustrating that the electronic apparatus is in the open state) or the first housing 2 and the second housing 3 are connected with each other in such a manner that the display surface 2*a* does not face the operation surface 3*a* when closed (FIG. 4 illustrating that the electronic apparatus is in the standing state).

What follows is one example of the detection mechanism of the detection unit. The other of the parts of the connector unit provided at the end surface of the first housing 2 has only one connector which is connected to either the first connector 28 or the second connector 29 depending on whether the first housing 2 is normally attached or reversely attached to the second housing 3. The detector determines which of the first connector 28 or the second connector 29 is connected to the connector at the first housing 2. In this way, it will be possible to determine whether the first housing 2 is normally connected to the second housing 3 (FIG. 1) or reversely connected to the second housing 3 (FIG. 4).

The wireless communication device 1 has a discovery unit and a determination unit. The discovery unit discovers whether or not the first housing 2 covers the second housing 3. The determination unit determines whether the first housing 2 and the second housing 3 are in the closed state (FIG. 2) or in the tablet state (FIG. 5) based on both the discovery signal of the discovery unit and the detection signal of the detection unit.

The detection unit, the discovery unit and the determination unit may be formed on either the control circuit for the first housing 2 or the control circuit for the second housing 3.

[Arrangement of Wireless Systems (Antennas)]

The wireless communication device 1 is required to improve its portability by promoting further miniaturization. The wireless communication device 1 is required to have a plurality of wireless systems (antennas). Because the wireless communication device 1 must not only access a plurality of wireless networks but also cope with the next-generation high-speed communication service.

Miniaturization of the wireless communication device 1 compels the antennas to be nearer to the electrically conductive member which accommodated by the wireless communication device 1. The antennas are suitably tuned to keep optimum the performance of the antennas (reception sensitivity or transmission power, for instance) even when the antennas are near the electrically conductive member.

The antennas will deteriorate in performance when the two-in-one device is brought to a tablet state, in which the first housing 2 covers the second housing 3 (FIG. 5). When the two-in-one device executes a wireless communication while in the closed state (FIG. 2), then the performance of each antenna will be important even when the first housing 2 covers the second housing 3. Antennas 11, 12, 13, and 14 arranged in the first housing 2 are close to the electrically conductive member (the touch operation unit 17, for instance) arranged in the second housing 3.

To achieve miniaturization without deterioration in the performance of each antenna, how to arrange the wireless systems (antennas 11, 12, 13, and 14) in the first housing 2 and the electrically conductive member (the touch operation unit 17, for instance) in the second housing 3 must be carefully contrived.

Figure 6:
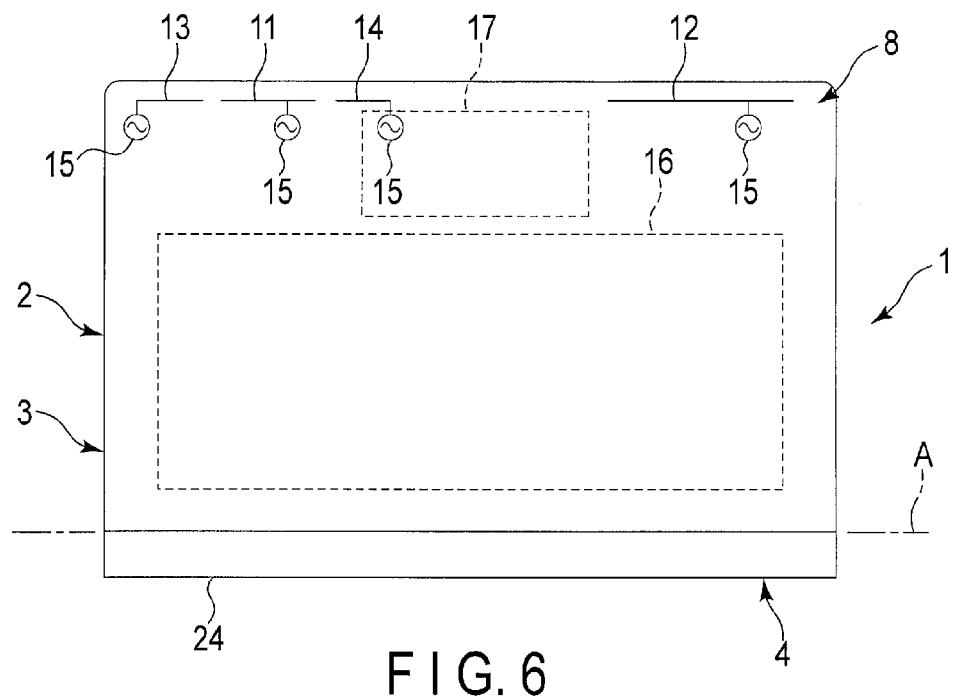
FIG. 6 is an exemplary plan view illustrating a positional relationship between the antenna and the touch operation unit when the electronic apparatus is in the tablet state as illustrated in FIG. 5.

FIG. 6 illustrates the arrangement of antennas 11, 12, 13, and 14 as seen from above the display surface 2*a* on the condition that the wireless communication device 1 is brought to a tablet state (FIG. 5), in which the first housing 2 covers the second housing 3 with the display surface 2*a* being exposed to the outside. It should be noted that the display unit 5, the input unit 7, the camera 9, the camera board 10, etc. are left out from FIG. 6 to make the configuration easy to see.

Antennas 11, 12, 13, and 14 will be the weakest in electric field at their individual areas including their individual one ends (their individual feedpoints 15). The individual electric fields will be stronger from the individual one ends (the individual feedpoints 15) to the individual other ends (the individual open ends). Therefore, antennas 11, 12, 13, and 14 will be the strongest in electric field at their individual areas including their individual other ends (their individual open ends).

When an antenna is arranged in such a manner that its area stronger in electric field than the rest of its areas is near or over the electrically conductive member, the electrical interference which the antenna receives will be large. In contrast, when an antenna is arranged in such a manner that its area weaker in electric field than the rest of its areas is near or over the electrically conductive member, the electrical interference which the antenna receives will be small.

If there is no choice but to make any one of antennas 11, 12, 13, and 14 overlap the electrically conductive member (the touch operation unit 17, for instance) when the wireless communication device 1 is brought to the tablet state (FIG. 5), then it is desirable that the selected one of antennas 11, 12, 13, and 14 should be arranged in such a manner that its area including its one end (its feedpoint 15) overlaps the electrically conductive member (the touch operation unit 17). In the tablet state, the part of one of the antennas 11, 12, 13, and 14 overlap the electrically conductive member in a direction perpendicular to the operation surface 3*a*.

Furthermore, it is desirable that the operation surface 3*a* surrounding the electrically conductive member (the touch operation unit 17) should be non-conductive. If such is the case, the selected antenna will cover the non-conductive operation surface 3*a* except its area including its one end (its feedpoint 15) when the wireless communication device 1 is brought to the tablet state. Therefore, it is needless to say that the remaining antennas will cover the non-conductive operation surface 3*a* in the tablet state. Therefore, antennas 11, 12, 13, and 14 will be kept optimum in their respective antenna performances even if the wireless communication device 1 is in the tablet state.

When it is inevitable that any one antenna should overlap the electrically conductive member (the touch operation unit 17), then it is desirable that the overlapping area should be limited within such an extent that should allow the antenna in question to fully exhibit its antenna performance. The antenna may completely lose its antenna performance if the overlapping area is too large.

Furthermore, if the first housing 2 accommodates a plurality of wireless systems (antennas 11, 12, 13, and 14), then it is desirable to construct the wireless communication device 1 in such a manner that only one of the antennas should overlap the electrically conductive member (the touch operation unit 17).

It should be noted that the selected one of the antennas is constructed as an antenna for a wireless system using the highest frequency among the plurality of wireless systems accommodated by the first housing 2. As described above, the higher the frequency which an antenna uses will be, the shorter the length of the antenna will be. Therefore, the selected one of the antennas is constructed as the shortest antenna among the plurality of wireless systems accommodated by the first housing 2.

It is the fourth antenna 14 that satisfies the above condition among the plurality of wireless systems (antennas 11, 12, 13, and 14) accommodated by the first housing 2. The fourth antenna 14 uses the highest frequency. In other words, the fourth antenna 14 is the shortest of all.

It should be note that the fourth antenna 14 may be a multiband antenna using a plurality of frequency bands. Namely, the fourth antenna 14 is connected with either a plurality of wireless chips or a wireless chip using a plurality of frequency bands. Furthermore, when the fourth antenna 14 is a multiband antenna, the lowest frequency among the frequencies which the fourth antenna 14 uses is higher than any other frequencies which the remaining antennas support.

An antenna that is partially placed over the electrically conductive member (the touch operation unit 17) is none other than the fourth antenna 14 exclusive to a wireless system which uses the highest frequency or the shortest wavelength among the plurality of wireless systems which the wireless communication device 1 uses. This arrangement makes it possible to increase the distance in terms of frequency between the fourth antenna 14 and the electrically conductive member. As a result, the electrical interference between the fourth antenna 14 and the electrically conductive member can be suppressed to a minimum.

The fourth antenna 14 extends from its feedpoint 15 to its open end in a direction away from the electrically conductive member (a direction towards a higher leftward position from the surface of FIG. 6). This arrangement makes it possible to prevent the electrically conductive member affecting the open end.

The above arrangement of the wireless system (the antenna) makes it possible to keep the fourth antenna 14 at an electrical distance from the electrically conductive member (the touch operation unit 17), since the fourth antenna 14 using the highest frequency overlaps the electrically conductive member (the touch operation unit 17). In addition, the electrical interference between the fourth antenna 14 and the electrically conductive member will be reduced to a minimum, since only a part of the fourth antenna 14, namely, that part of the fourth antenna 14 that is the weakest in electric field is placed on the electrically conductive member (the touch operation unit 17).

In other words, if the part of the fourth antenna 14 exclusive to the shortest wavelength is placed over the electrically conductive member (the touch operation unit 17) (along with the feedpoint 15 of the fourth antenna 14), it will be possible to keep the fourth antenna 14 away from the electrically conductive member (the touch operation unit 17) in terms of electrical distance and to educe to a minimum the electrical interference between the fourth antenna 14 and the electrically conductive member.

Furthermore, the arrangement in which the fourth antenna 14 overlaps the electrically conductive member (the touch operation unit 17) makes it possible to miniaturize the first housing 2 by such an amount that the fourth antenna 14 overlaps the electrically conductive member (the touch operation unit 17). The miniaturization of the first housing 2 leads to the miniaturization of the second housing 3. The miniaturization of the first housing 2 and the second housing 3 in turn leads to the miniaturization of the wireless communication device 1.

Since only a part of the fourth antenna 14 covers the electrically conductive member (the touch operation unit 17), the electrical interference affecting the fourth antenna 14 can be kept to a minimum. Namely, since only a part of the fourth antenna 14 covers the electrically conductive member, the fourth antenna 14 will not lose its function of an antenna. The fourth antenna 14 is prevented from deteriorating in antenna performance.

Since the operation surface 3a is non-conductive except for the area which may be covered with the part of the fourth antenna 14, it is possible to keep not only the fourth antenna 14 but also remaining antennas 11, 12, and 13 optimum in their respective antenna performances even in the a tablet state (FIG. 5).

In some cases, the wireless systems (antennas 11, 12, 13, and 14) accommodated by the first housing 2 stay away from the display surface 2a and are arranged on close to the back surface 2b (FIG. 2). In such a case, the fourth antenna 14 ought to be much nearer to the electrically conductive member (the touch operation unit 17) when the wireless communication device 1 is brought to a tablet state (FIG. 5).

However, even in such a case, the arrangement in which the fourth antenna 14 alone overlaps the electrically conductive member (the touch operation unit 17) makes it possible to miniaturize the wireless communication device 1 while preventing all the antennas from deteriorating in the respective antenna performances.

Figure 7:
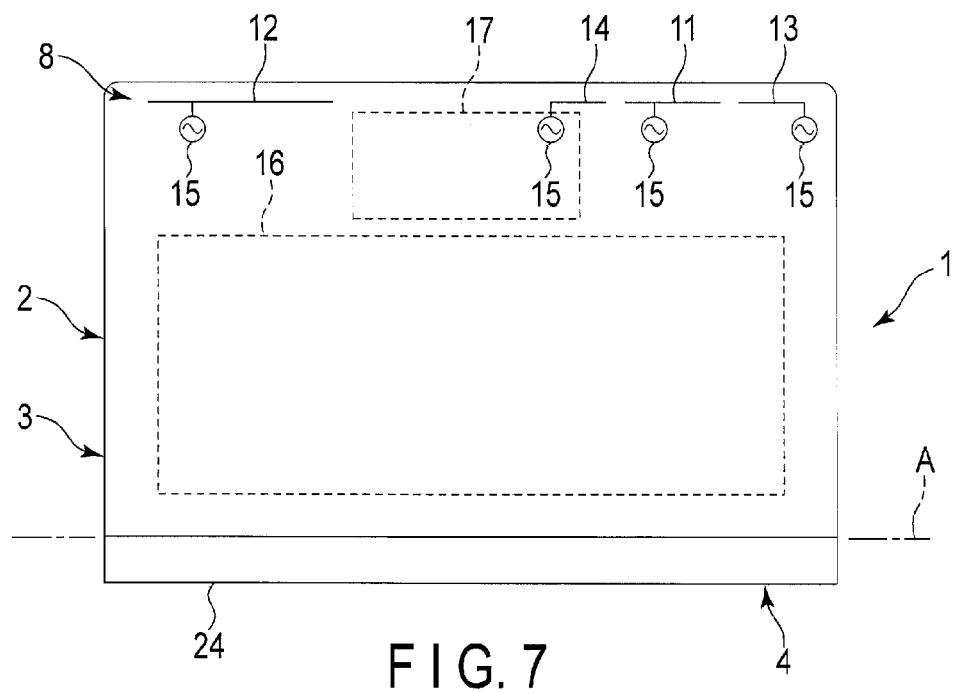
FIG. 7 is an exemplary plan view illustrating a positional relationship between the antenna and the touch operation unit when the electronic apparatus is in the closed state as illustrated in FIG. 2.

Furthermore, the above arrangement of the wireless systems (the antennas) makes it possible, as illustrated in FIG. 7, to make the fourth antenna 14 overlaps the electrically conductive member (the touch operation unit 17) when the wireless communication device 1 is brought to a closed state (FIG. 2). In the closed state, the part of one of the antenna 14 overlaps the electrically conductive member in a direction perpendicular to the operation surface 3a.

Whether the wireless communication device 1 is brought to a closed state (FIG. 2) or to a tablet state (FIG. 5) entirely depends on whether the first housing 2 is normally connected to the second housing 3 (FIG. 1) or reversely connected to the second housing 3 (FIG. 4). It is relatively easy to make the fourth antenna 14 overlap the electrically conductive member (the touch operation unit 17) before and after the first housing 2 is connected to the second housing 3.

When the wireless communication device 1 is brought to a closed state (FIG. 2), a part of the fourth antenna 14 will be covered with the electrically conductive member, but the remaining parts of the fourth antenna 14 will be covered with the electrically non-conductive member in the same way as remaining antennas 11, 12, and 13 just like the case in which the wireless communication device 1 is brought to a tablet state (FIG. 5). Therefore, all antennas 11, 12, 13, and 14 will be always kept optimum in their respective antenna performances even in the closed state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising: a first housing comprising: a display unit comprising an input function, and a display surface for the display unit; a second housing comprising an operation unit comprising an electrically conductive member, and an operation surface for the operation unit; and a connecting mechanism detachably connecting the first housing and the second housing, and allowing the first and the second housing to rotate relatively to each other while the first and the second housing being detachably connected to each other, wherein the first housing comprises antennas for wireless communication at locations evading the display unit, the connecting mechanism is configured to connect the first housing to the second housing allowing the display surface to come close to the operation surface, in an open state allowing an operation through the operation unit, and to connect the first housing reversely to the second housing making the display surface point in one direction and the operation surface point in another direction opposite to the one direction, in a tablet state allowing an operation through the display unit, a part of one of the antennas is configured to be over the electrically conductive member in the tablet state, the part of the one of the antennas comprises a feedpoint, the operation surface is electrically non-conductive except for an area of the electrically conductive member, the one of the antennas is covered with the electrically non-conductive operation surface in the tablet state and in a closed state except for the part of the one of the antennas, and the one of the antennas is a multiband antenna, and the lowest frequency among the frequencies supported by the one of the antennas is higher than any other frequencies supported by the remaining antennas.

2. The electronic apparatus of claim 1, wherein the second housing further comprises a keyboard and a palmrest, and the operation unit is disposed on the palmrest.

3. The electronic apparatus of claim 2, wherein the operation unit comprises one of a touchpad and a button.

4. The electronic apparatus of claim 1, wherein the part of the one of the antennas is disposed in an area weakest in electric field.

5. The electronic apparatus of claim 1, wherein the one of the antennas is constructed as an antenna for a wireless system using a highest frequency among wireless systems accommodated by the first housing.

6. The electronic apparatus of claim 1, wherein the one of the antennas is constructed as an antenna suitable for the shortest wavelength among wireless systems in the first housing.

7. The electronic apparatus of claim 1, wherein the first housing comprises the display surface and a back surface opposite to the display surface, and the one of the antennas is disposed away from the display surface and close to the back surface.

8. The electronic apparatus of claim 1, wherein the one of the antennas overlaps the electrically conductive member in the closed state in which the first housing is connected to and placed on the second housing allowing the display surface to come close to the operation surface.

9. The electronic apparatus of claim 1, wherein the first housing functions as a tablet device operated by touching the display surface upon separated from the second housing.

10. The electronic apparatus of claim 1, wherein the electrically conductive member is formed as a touch operation unit operated by touching the electrically conductive member in the open state.

* * * * *